Patented June 21, 1927.

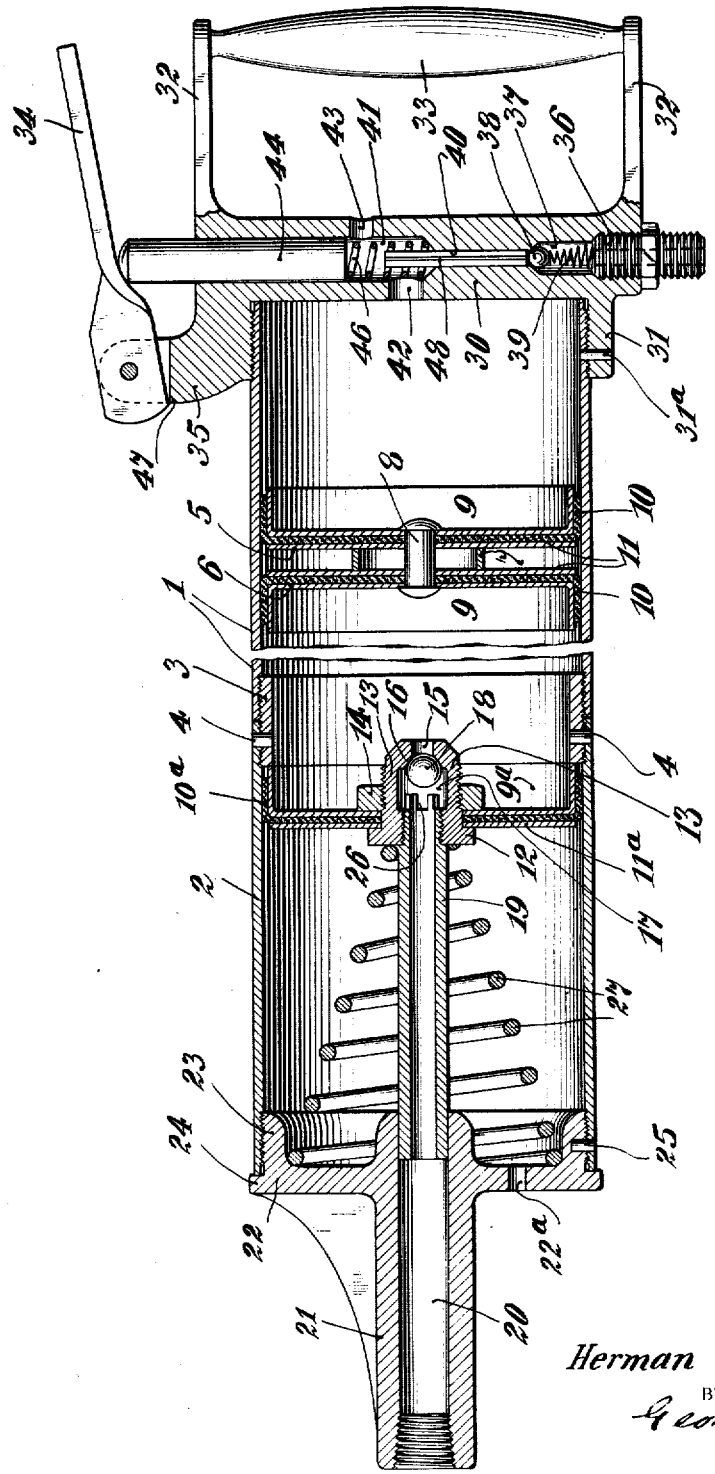

1,633,356

UNITED STATES PATENT OFFICE.

HERMAN ALBERTINE, OF EAST RUTHERFORD, NEW JERSEY, ASSIGNOR TO CHARLES P. ROGERS AND COMPANY (INC.), A CORPORATION OF NEW YORK.

FORCE-FEED LUBRICATING APPARATUS.

Application filed January 9, 1926. Serial No. 80,139.

My present invention relates to apparatus of the above type, particularly designed for forcing grease into lubricating ducts of bearings, particularly on automobiles and specifically considered, it is designed for general garage use, being equally well adapted for large-quantity, low-pressure feed as for the casings of universal joints, differential gears, etc., and for higher but still moderate pressure such as is required to force the grease through the valve ducts or nipples used on automobile bearings, and for the still higher pressures that may be necessary where such valves or ducts are stuck or clogged. It will be evident, however, that the device, and various features thereof may be useful in many other relations where it is desired to have the reservoir feed of fluid against widely different resistances, particularly where the amount of resistance cannot be known until pressure is applied in an effort to overcome it.

More specifically considered, the invention includes a grease reservoir, means for applying pressure to the entire body of grease to force it through a lubricating outlet passage and means whereby the effective pressure in the passage is automatically multiplied when a resistance to be overcome exceeds a predetermined value. Preferably, the primary pressure whereby my apparatus gives the above described direct initial effect and the above described automatically multiplied effect, is compressed gas, and for ordinary purposes the gas will be air and the source of pressure an ordinary tire filling apparatus such as is in common use in the garage.

The above is also accomplished by providing a reservoir, preferably a cylinder, in which a body of grease is maintained between two pistons, a primary, double-headed piston, the rear face of which is subjected to the pneumatic pressure and the front face of which applies the pressure to the grease. The secondary piston, enclosing the other end of the body of grease, is normally held in a predetermined position by means of a spring and in such position serves merely as a wall of the reservoir through which grease is forced through the outlet, by the pneumatic pressure of the primary piston. The outlet, however, comprises telescoping members, one of which is the fixed nozzle for application to the device to be lubricated, and the other of which is carried by said secondary piston. So long as the resistance against which the grease is being forced, is less than the pressure of the spring holding the secondary piston in its normal position, the grease flows out through the piston head and tube carried thereby, into the fixed tube, only under the "per square inch pressure" afforded by the air behind the primary piston, but when the resistance becomes sufficient, the pressure piles up and the secondary piston is forced rearwardly against its spring, telescoping into the fixed nozzle tube and displacing grease which necessarily flows backward into the reservoir. This back-flow of grease is prevented by check valve which automatically closes, whereupon the entire pressure over the flat area of the secondary piston is applied on the small cross section of grease in the telescoping members. Even in a relatively small diameter gun, the area of the secondary piston may be, say, five square inches as against $\frac{1}{5}$th square inch cross-section of the telescopic cylinder, which is now acting as the piston. In such case, a pressure of, say, 50 pounds per square inch from a tire inflating system applied behind the primary piston will apply a pressure of, say, 250 pounds on the total five square inch area of the secondary piston, and this 250 pounds pressure applied on a $\frac{1}{5}$th square inch cross section gives an effective maximum pressure of 2500 pounds to the square inch at the outlet of the grease gun.

Another feature of the invention is a very simple valve and trigger operating means located on the rear end of the grease gun, in convenient relation to the thumb of the user, this valve being easily operable either to apply or vent the pneumatic pressure behind the primary piston, and to thus variably increase or decrease effective pressures, from zero or atmosphere up to the maximum pressure available from the source.

It is evident that the source may supply a much higher pneumatic pressure than that indicated above; also that the term "pneumatic" is intended to include pressure of gases other than air as, for instance, the high pressures available from containers for liquid carbon dioxide; also that the lubricating material referred to as "grease" may be any lubricant, including relatively thin oils as well as the hardest or stickiest greases used for lubrication.

The above and other features of my invention will be more evident from the accompanying drawing, in which—

The figure is a longitudinal section through the axis of the complete device, the handle and movable parts of the valving mechanism being shown in elevation.

The reservoir is shown as a cylinder comprising two sections, 1, 2, of any desired diameter, preferably the same diameter, detachably secured as by an internal sleeve, 3, threaded to adjacent ends of the sections and secured to one of them, preferably section 2, as by pin rivets, 4, 4.

In section 1. there is a double-headed piston comprising the head, 5, adapted to sustain the actuating air pressure and a head, 6, facing the opposite way, to apply said pressure to the grease. These heads are spaced apart a distance sufficient to prevent tendency to cock in the cylinder by a spacer cylinder, 7, with the end of which they are tightly engaged by a rivet, 8. This rivet is double-headed and serves also to secure together the parts of the two piston heads which each comprise, a metal cup, 9, cup washer, 10, preferably of leather, and a disc, 11, whereby the cup leather is clamped against a cup, 9.

It will be understood that the cylinder section, 1, may be as long as desired and that this is filled with grease by unscrewing it from the collar, 3, and filling it through the open end.

Section 2 contains the secondary piston, faced toward the grease and of the same construction as the heads in section 1, except that the cup, 9ª, cup leather, 10ª, and disc, 11ª, are clamped together between a flange, 12, integral with a tubular nipple, 13, and a nut, 14, screwed on the exterior of said nipple.

This nipple has the grease inlet, 15, formed with a valve seat, 16, leading to a valve chamber, 17, containing a ball valve, 18. The outlet of this chamber is through a tube, 19, telescoping in a cylindrical outlet passage, 20, in the nozzle, 21, carried by the head, 22, closing the outer end of cylinder, 2, the securing means including a screw-threaded flange, 23, engaging the interior of the cylinder, a radial flange, 24, engaging the end of the cylinder and suitable means such as a rivet pin, 25, securing the parts against unscrewing.

In the form shown, tube 19 is screw-threaded into the valve chamber nipple, 13, and is formed within the chamber with projections, 26, whereby the ball, 18, is prevented from ever closing the outlet through tube 19. A spring, 27, seated against the inner face of closure, 22, encircles tube 19 and bears against the rear of valve fitting, 12. This spring forces the secondary piston to a predetermined normal position, in which the edge of cup, 9, bears firmly upon the end of the coupling collar, 3. It is evident that as against all pressures, up to the limit of the power of spring, 27, the cup, 9ª, of the secondary piston is a fixed wall of the grease containing chamber, the oppositely directed cup, 9, of the primary piston being a cooperating movable wall for said chamber. Consequently, when the primary cup, 9, is forced against the grease, the cup, 9ª, remaining stationary, the ball, 18, will be forced back into the valve chamber, 17, but will be prevented from closing the outlet, by engagement with projections, 26. In this situation, grease will be forced out through tube, 19, into tubular passage, 20, in the nozzle and thence out through the end of the nozzle. But whenever pressure is applied on the grease in excess of what the spring 27 can withstand, as will naturally be necessary whenever the resistance and back pressure on the nozzle becomes sufficiently great, the secondary piston will compress the spring moving rearwardly and carrying with it the tube, 19. The back-pressure of the grease will immediately carry the ball to the position shown in the figure, where it locks back flow escape of grease into the cylinder. The grease in 19, 20, being thus confined, all the grease in 20 becomes an independent reservoir subjected to all of the pressure applied over the entire area of the secondary piston, 9ª. The spring, 27, may of course be designed to hold up against any pressure less than the total pressure that can be transmitted through the grease from the primary pressure means acting on the primary piston.

The means for applying and controlling the primary pressure is in the end closure for cylinder section 1. This closure comprises an end wall, 30, having an internally threaded flange, 31, prevented from unscrewing as by pin rivet, 31ª. It is preferably provided with integral parallel extensions, 32, 32, supporting a transverse handgrasp, 33, and preferably a lever, 34, for controlling inlet and outlet of pneumatic pressure, has its operating end in position for engagement by the thumb of an operator grasping handle 33. The lever, 34, is pivoted in a bracket extension, 35, of the enclosure, 30. The latter has screw-threaded therein a nipple, 36, for connection to any suitable source of pneumatic pressure. This nipple supplies air to valve chamber, 37, containing ball valve, 38, normally held closed by spring, 39. This valve controls a passage, 40, leading to a cylindrical chamber, 41, which has a port, 42, through which the air pressure may be applied within the cylinder, 1, behind the primary piston. It also has a vent outlet, 43.

The chamber, 41, has a piston plunger, 44, having its outer end held in engagement with operating lever, 34, by pressure of spring, 46. The front face of this plunger is normally held just clear of the vent outlet, 43, by the lever, 34, the outward movement of the latter being limited by a heel member, 47, which comes in contact with the adjacent surface of bracket, 35. When the lever, 34, is depressed against the pressure of spring, 46, the plunger moves inward, closing the outlet, 48, and thereafter it will contact with the end of a channel bar, 48, which extends down through passage, 40, into engagement with the inlet ball valve, 38. In this position, the operator will feel the sudden though slight increase of resistance, due to the pressure of spring, 39, and the air pressure on the ball, and the distance of plunger movement between vent closure and compressed air inlet makes possible a most delicate control of increase and decrease of pressure on the primary piston; that is to say, the distance between vent closure and inlet opening positions of the plunger permits admitting a desired amount of compressed air and then closing the inlet without opening the outlet, and thereafter the outlet may be regulably opened to decrease the pressure to a desired extent without opening the inlet.

A breather opening, 22ª, may be provided in the other end of the device to maintain atmospheric pressure on the rear surface of the secondary piston during times when it pushes back under excess pressure and resistance or return to normal position shown in the drawing, when such pressure is relieved.

I claim:—

1. In fluid feeding means, a casing including a reservoir for the fluid, means comprising compressed air for applying pressure thereon, outlet means including cylinder and piston elements, the piston head being yieldably spring held in pressure receiving relation to the fluid and having a hollow stem for outflow of said fluid, the outlet end of said stem being formed as a piston fitting an outlet passage with which it telescopes upon rearward movement of said spring held piston, a valve whereby reverse flow of the fluid through the stem may be prevented, and means for preventing disengagement of said telescoping members.

2. In pressure feed means, a casing including a plurality of piston and cylinder elements, means for enclosing a body of fluid in pressure transmitting relation between two of said pistons, means including compressed air whereby one of said pistons may be forced against the fluid to transmit pressure to the other piston and spring means for holding the latter piston in normally fixed position, a tube carried by said latter piston and having one end extending through said piston, the other end formed as a tubular piston telescoping in a cylindrical outlet nozzle upon rearward movement of said spring pressed piston, and means for preventing disengagement of said telescoping members.

3. A cylindrical reservoir having end closures, one of which has an outlet, a tube having one end fitted as a piston adapted to reciprocate in said outlet and the other end carried by and opening through a piston normally sustained by a spring against pressure of a body of lubricant in the reservoir so that the lubricant is forced through said tube into the nozzle so long as the pressure on the fluid is greater than the resistance or back pressure on the outlet nozzle, means for preventing back flow of lubricant through said tube when the spring pressed piston yields, and means for preventing disengagement of said reciprocating members.

4. A grease gun, comprising cylindrical sections, having adjacent ends detachably coupled, one of said sections having a piston adapted to apply pressure upon grease charged into the open end thereof when it is detached from the other section, and the other section having a piston spring pressed toward the coupling end thereof and provided with a tubular piston rod extending rearwardly into a cylindrical outlet nozzle in which it is fitted as a piston, a non-return valve for said tubular piston rod, and means preventing said piston from moving beyond said coupling end.

5. A grease gun, comprising cylindrical sections, having adjacent ends detachably coupled, one of said sections having a piston adapted to apply pressure upon grease charged into the open end thereof when it is detached from the other section, and the other section having a piston spring pressed toward the coupling end thereof and provided with a tubular piston rod extending rearwardly into a cylindrical outlet nozzle in which it is fitted as a piston, and a non-return valve for said tubular piston rod, for the purposes described, in combination with means for applying pressure on said first mentioned piston, including a head closing the rear end of the first mentioned cylinder section provided with suitable inlet and vent ports communicating with a compressed air inlet normally closed by a check valve maintained on its seat by the compressed air pressure; together with means including a plunger adapted to close the vent and then open said inlet check valve.

6. A grease gun, comprising cylindrical sections, having adjacent ends detachably coupled, one of said sections having a piston adapted to apply pressure upon grease charged into the open end thereof when it is detached from the other section, and the other section having a piston spring pressed toward the coupling end thereof and provided with a tubular piston rod extending rearwardly into a cylindrical outlet nozzle in which it is fitted as a piston, and a non-return valve for said tubular piston rod, for the purposes described, in combination with means for applying pressure on said first mentioned piston, including a head closing the rear end of the first mentioned cylinder section provided with suitable inlet and vent ports communicating with a compressed air inlet normally closed by a check valve maintained on its seat by the compressed air pressure; together with means including a plunger adapted to close the vent and then open said inlet check valve, and a lever for controlling said plunger extending in position to be depressed by the thumb of an operator with his hand fingers grasping a handle on the rear end of the device.

7. A grease gun, including a cylindrical reservoir having a nozzle at one end and containing a piston one face of which is adapted to apply pressure upon grease charged into said cylinder, in combination with means for applying pressure on said piston, including a head closing the rear end cylinder, provided with suitable inlet and vent ports communicating with a compressed air inlet normally closed by a check valve maintained on its seat by the compressed air pressure; together with means including a plunger adapted to close the vent and then open said inlet check valve.

8. A grease gun, including a cylindrical reservoir having a nozzle at one end and containing a piston one face of which is adapted to apply pressure upon grease charged into said cylinder, in combination with means for applying pressure on said piston, including a head closing the rear end cylinder, provided with suitable inlet and vent ports communicating with a compressed air inlet normally closed by a check valve maintained on its seat by the compressed air pressure; together with means including a plunger adapted to close the vent and then open said inlet check valve, and a lever for controlling said plunger extending in position to be depressed by the thumb of an operator with his hand fingers grasping a handle on the rear end of the device.

9. A grease gun, including a casing having a grease reservoir, an outlet at one end of said casing, means including air pressure for forcing the grease towards said outlet, a movable piston of relatively large area between the grease and the gun outlet, and subject to pressure exerted on said grease, means normally sustaining said piston against the pressure of the grease under the moderate pressures required to force feed the grease against ordinary working resistances but adapted to yield when greater pressures are applied against greater resistances, relatively small area telescoping tubes constituting piston and cylinder elements of a force pump, one carried by and communicating with the pressure side of the larger piston and the other rigidly connected to and discharging grease through the grease gun outlet, an inlet valve adapted to be opened and permit flow of grease through the pump under the primary pressure when the large area piston is sustained against said pressure and adapted to close and prevent reverse flow of grease into the reservoir, when said piston yields and means for preventing disengagement of said telescoping members.

10. A grease gun, including a casing having a grease reservoir, an outlet at one end of said casing means including air pressure for forcing the grease therein towards said outlet, a movable piston of relatively large area between the grease and the gun outlet, and subject to pressure exerted on said grease, means normally tending to sustain the said piston against the pressure of the grease under the moderate pressures required to force feed the grease against ordinary working resistances but adapted to yield when greater pressures are applied against greater resistances, a passage from the pressure side of the large area piston to the grease gun outlet, including relatively small area piston and cylinder pump elements, one carried by and communicating with the pressure side of the larger piston and the other rigidly connected to and discharging grease through the grease gun outlet; said passage being provided with an inlet valve adapted to open and permit through flow of grease under the primary pressure when the larger piston is sustained against said pressure and closing to prevent reverse flow of grease into the reservoir, when said piston yields and causes a forcing stroke of the pump element carried thereby and means for preventing disengagement of said small area piston and cylinder pump elements.

11. A grease gun, including a casing having a grease reservoir, an outlet at one end of said casing means including air pressure for forcing grease towards said outlet, a movable piston element of relatively large area against which pressure on said grease is exerted, and means normally operating to sustain said piston against the pressure of said grease, a relatively small area force pump including piston, cylinder and valve elements affording a normally open inlet and an outlet through which grease may be forced to the gun outlet under the primary pressure, the force pump elements being arranged so that the inlet is closed and a forcing stroke of said pump is actuated by said large area piston element whenever it yields under the primary pressure and means limiting the movement of such larger area piston element away from said outlet.

12. A grease gun, including a casing having a grease reservoir, means including air pressure for applying pressure on the grease therein, a passage from the interior of the reservoir to a suitable grease gun outlet, including relatively small diameter telescoping tubes constituting piston and cylinder pump elements of a small force pump, one of said tubes being carried by and receiving grease from said pressure reservoir, and the other connected to and discharging grease through said grease gun outlet; said passage being provided with an inlet valve adapted to open and permit inflow of grease under the primary pressure when the pressure drop is outward and closing to prevent reverse flow of grease into the reservoir, when said tubes are forced to telescope and means preventing disengagement of said telescoping elements.

Signed at New York city in the county of New York, and State of New York, this 8th day of January, A. D. 1926.

HERMAN ALBERTINE.

12. A grease gun, including a casing having a grease reservoir, means including air pressure for applying pressure on the grease therein, a passage from the interior of the reservoir to a suitable grease gun outlet, including relatively small diameter telescoping tubes constituting piston and cylinder pump elements of a small force pump, one of said tubes being carried by and receiving grease from said pressure reservoir, and the other connected to and discharging grease through said grease gun outlet; said passage being provided with an inlet valve adapted to open and permit inflow of grease under the primary pressure when the pressure drop is outward and closing to prevent reverse flow of grease into the reservoir, when said tubes are forced to telescope and means preventing disengagement of said telescoping elements.

Signed at New York city in the county of New York, and State of New York, this 8th day of January, A. D. 1926.

HERMAN ALBERTINE.

DISCLAIMER.

1,633,356.—*Herman Albertine*, East Rutherford, N. J. FORCE-FEED LUBRICATING APPARATUS. Patent dated June 21, 1927. Disclaimer filed May 24, 1929, by the patentee, said *Albertine*, and the assignee by mesne assignments, *Rogers Products Co., Inc.*

Hereby enter this disclaimer to that part of the claim in said specification which is in the following words, to wit:

"3. A cylindrical reservoir having end closures, one of which has an outlet, a tube having one end fitted as a piston adapted to reciprocate in said outlet and the other end carried by and opening through a piston normally sustained by a spring against pressure of a body of lubricant in the reservoir so that the lubricant is forced through said tube into the nozzle so long as the pressure on the fluid is greater than the resistance or back pressure on the outlet nozzle, means for preventing back flow of lubricant through said tube when the spring pressed piston yields, and means for preventing disengagement of said reciprocating members."

[*Official Gazette June 18, 1929.*]

DISCLAIMER.

1,633,356.—*Herman Albertine*, East Rutherford, N. J. FORCE-FEED LUBRICATING APPARATUS. Patent dated June 21, 1927. Disclaimer filed May 24, 1929, by the patentee, said *Albertine*, and the assignee by mesne assignments, *Rogers Products Co., Inc.*

Hereby enter this disclaimer to that part of the claim in said specification which is in the following words, to wit:

"3. A cylindrical reservoir having end closures, one of which has an outlet, a tube having one end fitted as a piston adapted to reciprocate in said outlet and the other end carried by and opening through a piston normally sustained by a spring against pressure of a body of lubricant in the reservoir so that the lubricant is forced through said tube into the nozzle so long as the pressure on the fluid is greater than the resistance or back pressure on the outlet nozzle, means for preventing back flow of lubricant through said tube when the spring pressed piston yields, and means for preventing disengagement of said reciprocating members."

[*Official Gazette June 18, 1929.*]